US012553692B2

(12) United States Patent
Reif et al.

(10) Patent No.: US 12,553,692 B2
(45) Date of Patent: Feb. 17, 2026

(54) ANGLE MIRROR WITH BACKUP SIGHT

(71) Applicant: Rheinmetall Landsysteme GmbH, Unterlüß (DE)

(72) Inventors: Thorsten Reif, Celle (DE); Friedrich Von Solms, Hermannsburg (DE)

(73) Assignee: Rheinmetall Landsysteme GmbH, Sudheide (DE)

( * ) Notice: Subject to any disclaimer, the term of this patent is extended or adjusted under 35 U.S.C. 154(b) by 322 days.

(21) Appl. No.: 18/273,132

(22) PCT Filed: Dec. 15, 2021

(86) PCT No.: PCT/EP2021/085916
§ 371 (c)(1),
(2) Date: Jul. 19, 2023

(87) PCT Pub. No.: WO2022/156966
PCT Pub. Date: Jul. 28, 2022

(65) Prior Publication Data
US 2024/0085154 A1    Mar. 14, 2024

(30) Foreign Application Priority Data
Jan. 25, 2021    (DE) ..................... 10 2021 101 519.7

(51) Int. Cl.
*F41H 5/26*    (2006.01)
*F41G 3/16*    (2006.01)

(52) U.S. Cl.
CPC .............. *F41H 5/266* (2013.01); *F41G 3/16* (2013.01)

(58) Field of Classification Search
CPC ................................. F41H 5/266; F41G 3/16
See application file for complete search history.

(56) References Cited

U.S. PATENT DOCUMENTS

| 3,207,034 A | 9/1965 | Harter |
| 3,990,778 A | 11/1976 | Magee et al. |
| 2003/0129567 A1 | 7/2003 | Cabato et al. |

FOREIGN PATENT DOCUMENTS

| DE | 32 35 998 A1 | 3/1984 |
| DE | 102 53 477 A1 | 4/2004 |
| EP | 1 118 895 A1 | 7/2001 |
| EP | 1 467 237 B1 | 5/2008 |
| EP | 3 252 424 A1 | 12/2017 |
| FR | 1231001 A | 9/1960 |
| IL | 94659 A | 2/1992 |
| WO | 2012/150039 A1 | 11/2012 |

OTHER PUBLICATIONS

DE 102019100913 A1 machine translation (Year: 2020).*

* cited by examiner

*Primary Examiner* — James A Dudek
(74) *Attorney, Agent, or Firm* — Young Basile Hanlon & MacFarlane, P.C.

(57) ABSTRACT

The invention relates to an angle mirror including a backup sight. The angle mirror includes a housing connected to a mirror head and a lower part. An objective is arranged outside of the housing and is connected to the housing by an optical connection, for example a fiber optic line, that does not require electrical power or current to transmit the image from the objective. The mirror head and the objective provide separate images to a first insight and a second insight, respectively. The objective functions as a backup or auxiliary sight of the surrounding environment even in the event of a power failure.

19 Claims, 4 Drawing Sheets

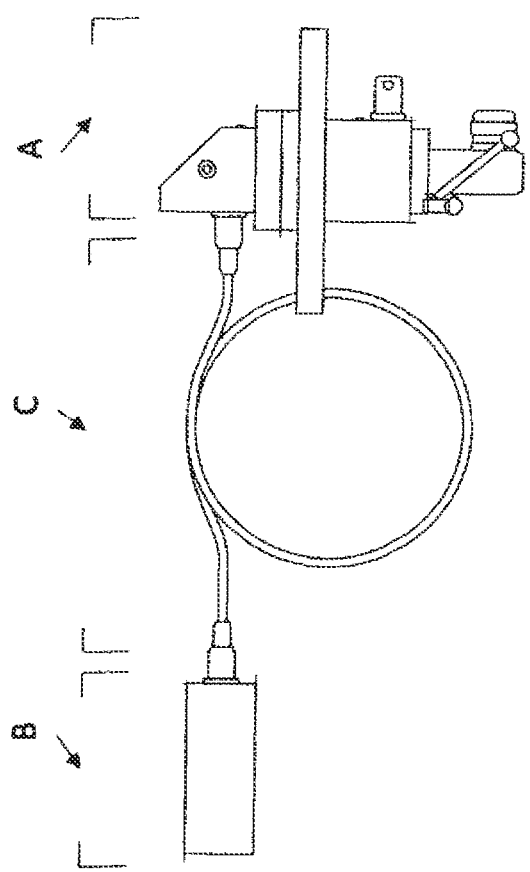
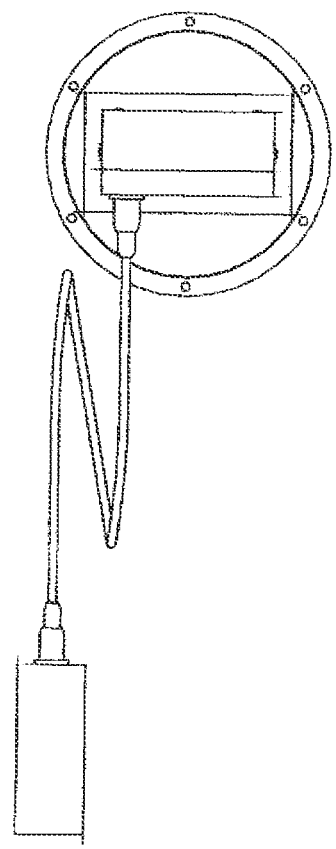
FIG. 1A
FIG. 1B

ANGLE MIRROR WITH BACKUP SIGHT

CROSS-REFERENCE TO RELATED APPLICATION(S)

This application is filed pursuant to 35 U.S.C. § 371 claiming priority benefit to PCT/EP2021/085916 filed Dec. 15, 2021, which claims priority benefit to German Patent Application No. 102021101519.7 filed Jan. 25, 2021, the contents of both applications are incorporated herein by reference in the entirety for all purposes.

TECHNICAL FIELD

The present invention relates to an angle mirror with a backup sight.

BACKGROUND

Corresponding angle mirrors are often used in vehicle technology to ensure images of the surroundings inside the vehicle. The crew of a vehicle should be able to observe the surroundings from inside the vehicle. Angled mirrors are known for this purpose, some of which protrude from the vehicle and some of which remain inside the vehicle.

The part of the angle mirror that remains inside the vehicle has an insight by means of which the crew of the vehicle can perceive an image from outside the vehicle.

The external image is transmitted to the insight via an optical guide inside the angle mirror. For this purpose, the angle mirror conventionally has an at least partially transparent mirror head in which optical signals from outside the vehicle can be picked up and guided through the angle mirror to the insight.

The guiding of optical signals in the angle mirror is done by corresponding mirrors, which guide optical signals from the mirror head to the insight. Prism arrangements are also known for guiding signals in an angle mirror.

Such an angle mirror is known, for example, from EP 3 252 424 A1. This publication discloses an angle mirror for an armored vehicle with a view and a outlook, whereby the optical signals from the outlook are directed via mirrors and prisms to the view so that vehicle occupants in the vehicle can see an image of the vehicle's surroundings.

In order to optimize image transmission from outside the vehicle to inside, it is also known to optimize the angle mirror using electronic components. For example, light amplification, night vision or a magnification function for the image to be viewed can be implemented.

However, such electronic enhancements to the image have the disadvantage that in the event of a power failure in an emergency situation, a poor to no image of the environment can be viewed through the angle mirror because the electronic components will fail.

Furthermore, a problem arises when a target is to be aimed through the angle mirror, as is common, for example, with armored vehicles with a turret superstructure and a weapon system. For this purpose, it would be helpful not only to be able to observe the field of view of the angle mirror defined in elevation, but also to be able to perform a civilization, depending on the elevation of the weapon.

In order to be able to use the angle mirror despite the first problem of an emergency situation without the presence of electrical energy, it is known to design the image transmission through the angle mirror via prisms and or optical fiber. For this purpose, a telescope for armored vehicles is known, for example, from EP 1 467 237 B1, which uses image conductors for image transmission.

It is also known to provide a second angle mirror on the vehicle for backup sighting. The problem here, however, is that additional space and a second observer are required in order to use such backup sights. Likewise, when using fiber optic lines for image transmission, it is usually not possible to optimize the image.

Thus, the task of the present invention is to overcome the aforementioned disadvantages of the prior art and to provide an angle mirror with backup sight, which remains operational at least for emergencies without electrical power and to minimize the space required for such double sighting.

This task is solved by the features of the main claim.

SUMMARY

Thus, an angle mirror system is proposed which is accommodated in a housing. The angle mirror system comprises a lower part and a mirror head, both of which are accommodated in the housing. The mirror head protrudes from the vehicle and is at least partially transparent so that optical signals can enter the mirror head in order to display an image of the surroundings by means of the angle mirror.

The lower part of the angle mirror is arranged inside the vehicle and contains a first insight by means of which the crew of the vehicle can perceive the image of the surroundings by means of the angle mirror.

According to the angle mirror system invention, an objective is further provided which is not located inside the housing of the angle mirror. This objective is arranged outside the housing on the vehicle, preferably on the weapon cradle, in order to be able to transmit images depending on the elevation of the weapon.

This objective is connected to the angle mirror via an optical connection, whereby this optical connection functions purely physically, preferably through at least one fiber optic line. In order to be able to connect the fiber optic line to the lens as well as to the angle mirror, ports are arranged for this purpose at the objective as well as also the angle mirror.

The angle mirror system is designed in this way can now normally transmit different images, namely on the one hand an image of the surroundings which is incident through the mirror head into the angle mirror, and also the image which is transmitted through the objective and the connection to the angle mirror.

In order to be able to transmit both images effectively, it is preferably proposed to provide a second insight on the angle mirror, which can display the image of the objective. Thus, the angle mirror comprises two insights, namely a first and a second insight, in order to be able to display two different images.

In a further embodiment, these two insights may be combined in one insight, so that both images are shown combined on one display or view.

In order to realize a target sighting with the image of the objective, a sighting mark can be used, which is adapted to the corresponding weapon. Particularly preferably, a stadiametric funnel is proposed as a sighting mark. Optionally, such a sighting mark can be illuminated by means of a tritium channel or a battery and a light source.

The image transmission via the mirror head of the angle mirror can be optimized electrically, as described in the state of the art. If an emergency situation should now arise, whereby no electrical energy is available, the objective fulfills the function of a backup sight thereby. This means that the backup sight is still ready for use without electrical energy. This ensures that it is possible to transmit an image of the surroundings to the vehicle at any time.

Furthermore, it is preferably proposed to design the angle mirror in such a way that it includes a rotary plate in order to make the lower part rotatable relative to the mirror head. The rotary plate is arranged in the roof area of the vehicle and ensures that the lower part is rotatable relative to the mirror head. As a further embodiment, it is conceivable that the angle mirror is designed to be rotatable as a whole. For this purpose, the swivel plate is connected to the vehicle in a stationary manner and the angle mirror can be rotated as a whole relative to the vehicle by means of the rotary plate. This makes it possible to ensure an all-round view from the vehicle.

In order to be able to vary the length of the angle mirror, it is also proposed to provide an intermediate piece between the mirror head and the lower part, through which the optical signal can then run between the mirror head and the lower part. Such an intermediate piece can compensate for heights which occur, for example, in the case of different armor plating of the roof of a vehicle.

The objective mounted externally with respect to the angle mirror preferably includes at least one lens through which the image is captured and subsequently transmitted via the connection to the angle mirror. By means of such a lens, it is possible to enlarge the image area to be transmitted or to realize a corresponding zoom.

Also conceivable is a lens system for the lens through which a variable zoom can be realized. Light amplification by such a lens system is also conceivable.

The ports for the connection between the objective and the angle mirror can be realized as a plug-in or screw connection. But a fixed, non-detachable connection at the ports is also conceivable.

Due to the aforementioned features, the angle mirror with backup sight has product-related and user-oriented advantages. The merging of two sights results in a compact system that is robust and easy to maintain. The user benefits from faster handling of the two adjacent fields of view or the combined field of view to perform his task. By integrating the image of the sight in the angle mirror, a compact design is realized.

BRIEF DESCRIPTION OF THE DRAWINGS

Further features are shown in the attached drawings. They show:

FIG. 1A: A schematic side view of an angle mirror according to the invention with attached objective.

FIG. 1B: A schematic top view of the angle mirror shown in FIG. 1A.

DETAILED DESCRIPTION

FIG. 1 shows a schematic representation of the components of an angle mirror system according to the invention. For this purpose, the angle mirror system includes an angle mirror (A), an objective (B), as well as a connection (C) between the angle mirror (A) and the objective (B). Thus, although the objective (B) is associated with the angle mirror (A), it is external and thus remote (e.g., positioned distant) from a housing (2) of the angle mirror (A).

Figure 2A:
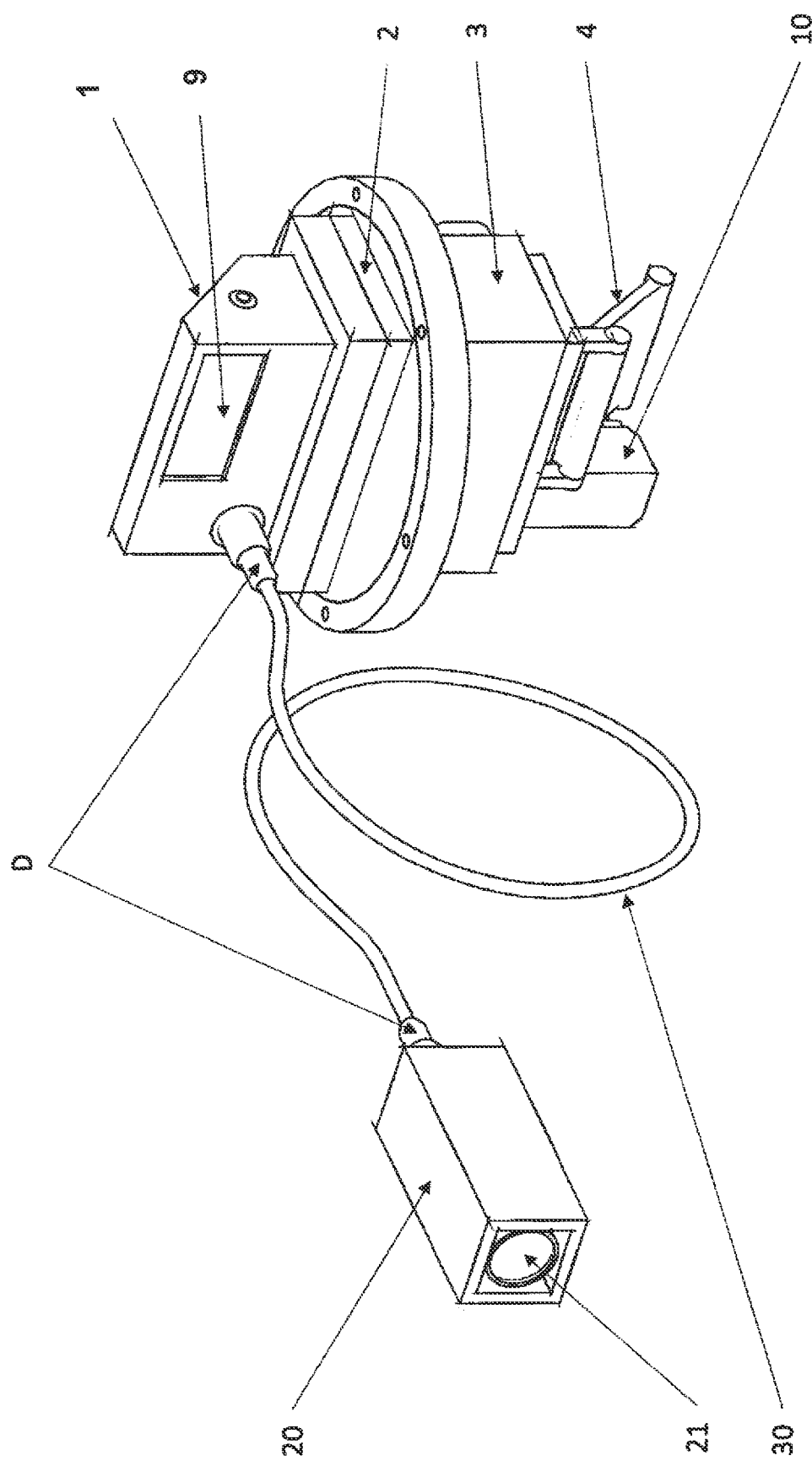
FIG. 2A: A schematic perspective frontal view of an angle mirror according to the invention.

As FIG. 2A shows, the connection (C) is preferably designed as at least one fiber optic line (30) and is provided with ports (D) via the mirror head (1) to the housing (2) of the angle mirror (A) as well as the objective (B). Through the ports (D), the connection (C) can be connected to the objective and the housing of the angle mirror to place the objective in optical communication with the angle mirror.

The objective (B) consists of an objective housing (20) and preferably of at least one lens (21) (e.g., having a second field of view of the surroundings exterior to the vehicle). The light entering the objective (B) is transmitted to the housing (2) of the angle mirror (A) through the connection (C) without current, whereby without current or currentless means that the transmission functions without electrical energy (e.g., requires no electrical power source).

The angle mirror (A) includes the housing (2) in which the mirror head (1) and a lower part (3) are arranged. The mirror head (1) is designed with an outlet (9) that is at least partially transparent (e.g., translucent) so that light can enter the housing (2) of the angle mirror (A) through the mirror head (1). For this purpose, the mirror head (1) can include the outlet (9) which represents the transparent area of the mirror head (1).

The lower part (3) includes at least one first insight (4)(e.g., positioned in the interior of the vehicle), which can display an image. Preferably, the lower part (3) includes a second insight (10) which can also display an image. For this purpose, it is proposed that the first insight (4) displays the image captured by the mirror head (1) and the second insight (10) displays the image captured by the objective (B).

With this embodiment it is possible to generate a first image, which is taken by the mirror head (1) (e.g., having a first field of view of surroundings exterior to the vehicle). This first image is led (i.e., transmitted) through the housing (2) of the angle mirror (A) to the first insight (4). Also, it is possible to generate a second image, which is taken through the objective (B). This second image is led (i.e., transmitted) through the connection (C) to the housing (2) of the angle mirror (A) to be displayed on the second insight (10).

The image of the mirror head (1) can be optimized. Thus, night vision, UV vision and/or infrared vision can be enabled, as well as filters (e.g., a filter positioned in the housing). Likewise, it is possible to set diopter settings for different vision at the second insight (10). Focusing and thus an adjustment to distance vision is also conceivable.

In one embodiment, it is possible to integrate the display of the second insight (10) into the first insight (4). In this embodiment (not shown), the second insight (10) is then to be understood as part of the first insight (4).

Figure 2B:
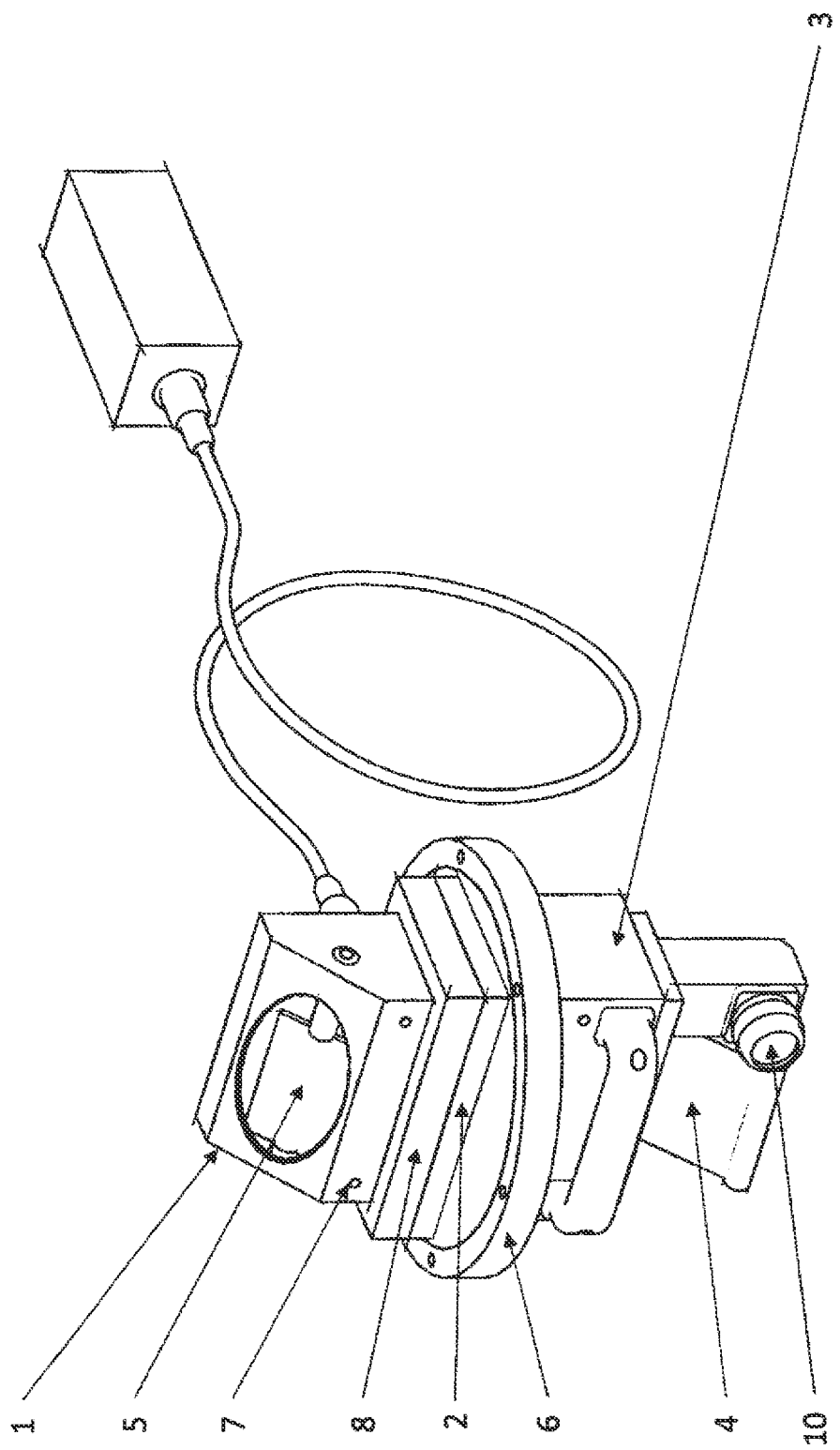
FIG. 2B: A schematic perspective rearward view of the angle mirror shown in FIG. 2A.

FIG. 2B shows an embodiment of the structure of the angle mirror (A) with the objective (B) connected via the connection (C). The angle mirror (A) consists of the mirror head (1) and the lower part (3), which are both arranged in the housing (2).

The housing (2) is mounted in a vehicle in such a way that at least the mirror head (1) projects out of the vehicle (e.g., protrudes from the roof to an exterior of the vehicle having a vehicle body) and can record an image of the surroundings (e.g., exterior to the vehicle). The lower part (3) is thereby arranged in the interior of the vehicle. For fastening the angle mirror (A), it is preferably proposed to provide a rotary plate (6) by means of which a roof fastening to a vehicle or a turret can be effected.

Such a rotary plate (6) can be used to realize (e.g., allow) a rotatability of the housing (2) relative to the vehicle or a rotatability of the lower part (3) relative to the mirror head (1). One possibility for extending the housing (2) is to arrange an intermediate piece (8) between the mirror head (1) and the lower part (3) through which the optical signal can then run or passes between the mirror head and the lower part. The intermediate piece (8) can compensate for heights which occur, for example, in the case of different armor plating of the roof of a vehicle.

The light incident in the mirror head (1) is guided via a mirror (5), or at least one mirror (5), to the first insight (4). The mirror is configured to divert the optical signal transmitted through the connection (C). Prisms (not shown) inside the housing (2) can contribute to the image transmission. The individual elements of the housing (2) can be connected to each other via fastening elements (7).

The mirror (5) is arranged movably to vary the field of view of the angle mirror (A).

Figure 3:
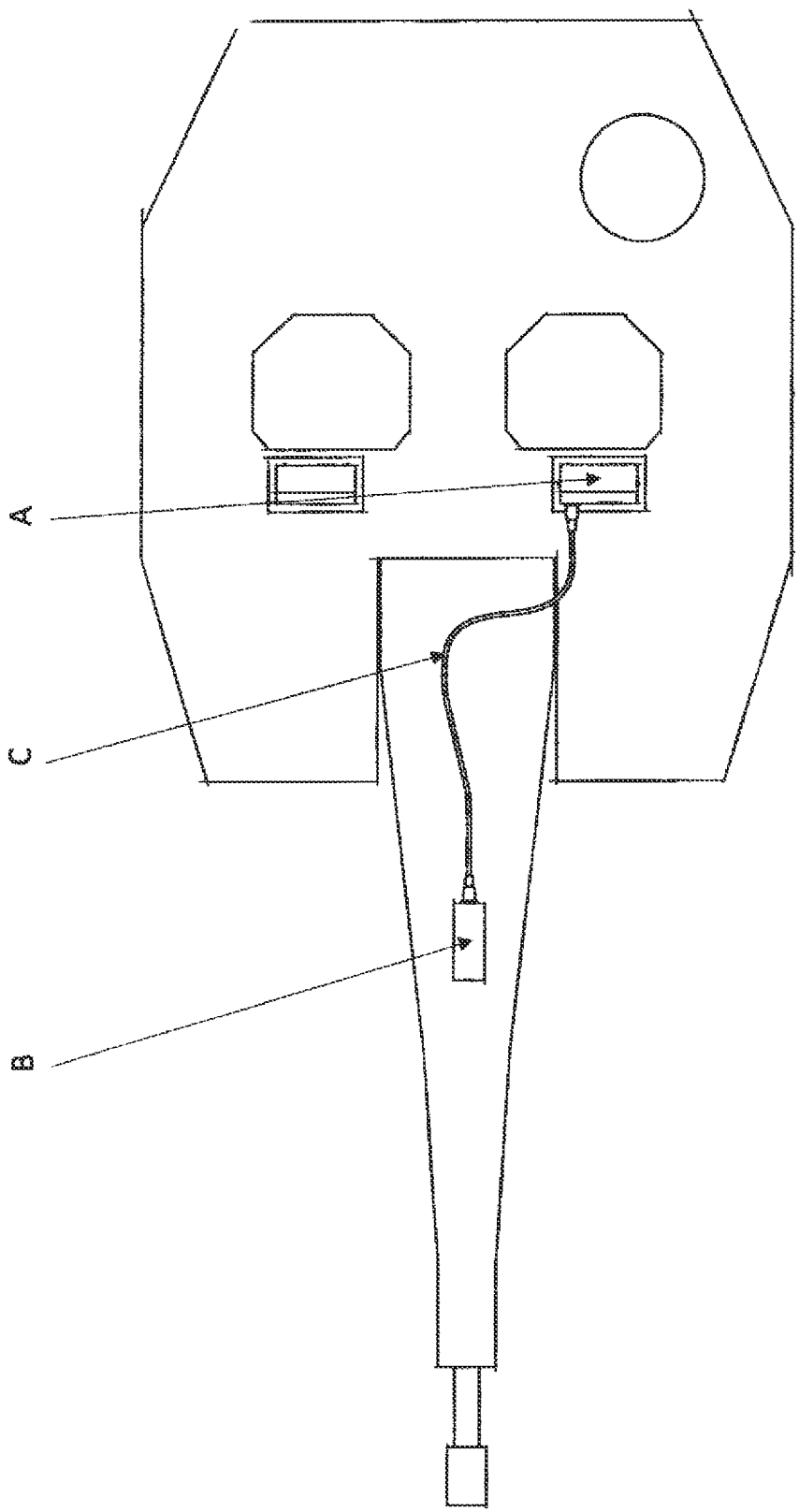
FIG. 3: A schematic top view of an angle mirror and lens shown mounted on a vehicle.

FIG. 3 shows a possible arrangement on a vehicle of the elements of the angle mirror according to the invention with the angle mirror (A) itself, the objective (B), and the connection (C) between objective (B) and the angle mirror (A).

The objective (B) is arranged on a weapon cradle of the vehicle in order to follow elevation movements. This enables aiming of a weapon via the image transmission of the objective (B) on the angle mirror (A).

The connection (C) is preferably implemented by at least one fiber optic cable. Corresponding excess lengths of the fiber optic cable can be compensated for by coiling of the excess length of the fiber optic cable between the objective (B) and the angle mirror (A), especially since freedom of movement must be compensated for by the movement of the weapon cradle.

The two separate images taken by the objective (B) and the angle mirror (A) are transferred to the housing (2) of the angle mirror (A) as aforementioned and transferred to the second insight and the first insight, respectively. In order to realize a target sighting with the image of the objective, a sighting mark can be used, which is adapted to the corresponding weapon. Particularly preferably, a stadiametric funnel is proposed as a sighting mark. Optionally, such a sighting mark can be illuminated by means of a tritium channel or a battery and a light source.

The insights (4), (10) can be implemented via optics, e.g., via lens arrangements. A screen display for the first insight (4) is also possible. In this example wherein the first insight (4) is a screen display, however, the second insight (10), which is not integrated into the first insight (4), is absolutely necessary, as otherwise backup sighting by the objective (B) as described above is no longer possible in the event of a power failure.

The present invention is not limited to the above features. Rather, other embodiments are possible. For example, the outlet (9) could be designed as a camera. The connection (C) could be implemented as a bundle of multiple fiber optic lines. Finally, an image transmission from the mirror head (1) could be implemented electronically throughout.

LIST OF REFERENCE SIGNS

1 Mirror head
2 Housing
3 Lower part
4 First insight
5 Mirror
6 Rotary plate
7 Fastening elements
8 Intermediate piece
9 Outlet
10 Second insight
20 Objective housing
21 Lens
30 Fiber optic line
A Angle mirror
B Objective
C Connection
D Ports

The invention claimed is:

1. An angle mirror system comprising:
   an angle mirror comprising:
      a housing;
      a lower part connected to the housing; and
      a mirror head connected to the housing; and
   an objective arranged outside the housing and connected to the angle mirror by an optical connection comprising an optical fiber line.

2. The angle mirror system according to claim 1, wherein the mirror head further comprises an outlet configured to be translucent.

3. The angle mirror system according to claim 1, wherein the lower part further comprises a first insight configured to present at least one image of a field of view of the angle mirror.

4. The angle mirror system according to claim 3, wherein the lower part further comprises a second insight configured to present at least one image of a field of view of the objective.

5. The angle mirror system according to claim 4, wherein the second insight is integrated into the first insight.

6. The angle mirror system according to claim 1, wherein the angle mirror further comprises a rotary plate configured to allow rotation of the lower part relative to the mirror head.

7. The angle mirror system according to claim 1, wherein the angle mirror further comprises an intermediate piece configured to provide height compensation between the mirror head and the lower part, through which an optical signal passes between the mirror head and the lower part.

8. The angle mirror system according to claim 1, wherein the objective further comprises an objective housing and at least one lens.

9. The angle mirror system according to claim 1, wherein the angle mirror and the objective each further comprise a port, the optical connection is configured to connect to the port on the angle mirror and the port on the objective to place the objective in optical communication with the angle mirror.

10. The angle mirror system according to claim 1, wherein the objective is configured to capture an image and the optical connection is configured for transmission of the captured image between the objective and the angle mirror, and wherein the capture of the image by the objective and the transmission of the captured image through the optical connection is currentless.

11. The angle mirror system according to claim 10, wherein the mirror head further comprises a mirror configured to divert an optical signal transmitted through the optical connection.

12. The angle mirror system according to claim 1, wherein the angle mirror further comprises at least one of an electrical element or a filter positioned in the housing and configured to optimize an image of a field of view of the angle mirror.

13. The angle mirror system according to claim 1, wherein the mirror head further comprises a sighting mark configured to be illuminated.

14. The angle mirror system according to claim 1, wherein the angle mirror is mounted to a vehicle having a roof, wherein the mirror head protrudes from the roof to an exterior of the vehicle, the mirror head is configured to provide a field of view of surroundings exterior to the vehicle.

15. The angle mirror system according to claim 14, wherein the vehicle further comprises a weapon cradle, and wherein the objective is mounted on the weapon cradle.

16. The angle mirror system according to claim 14, wherein the vehicle further comprises a turret, and wherein the objective is mounted on the turret.

17. The angle mirror system according to claim 1, wherein the angle mirror is mounted to a turret having a roof, wherein the mirror head protrudes from the roof to an exterior of the turret, the mirror head is configured to provide a field of view of surroundings exterior to the turret.

18. An angle mirror system mounted to a vehicle having a vehicle body, the angle mirror system comprising:
   an angle mirror comprising:
      an angle mirror housing connected to the vehicle body;
      a mirror head connected to the angle mirror housing and extending above the vehicle body to an exterior of the vehicle, the mirror head configured to have a first field of view of surroundings exterior to the vehicle;
      a lower part connected to the angle mirror housing and extending below the vehicle body into an interior of the vehicle;
      a first insight connected to the lower part and positioned in the interior of the vehicle, the first insight configured to view the first field of view from the interior of the vehicle; and
      a second insight;
   an objective connected to the vehicle and positioned distant from the angle mirror, the objective comprising:
      an objective housing; and
      a lens connected to the objective housing and configured to have a second field of view of the surroundings exterior to the vehicle, the second field of view is different from the first field of view; and
   a fiber optic line connected to the objective and in communication with the second insight, the fiber optic line configured to transmit the second field of view of the surroundings exterior to the vehicle to the second insight for view of the second field of view from the interior or the vehicle, wherein a transmission of the second field of view to the second insight and the view of the second field of view from the interior of the vehicle requires no electrical power source.

19. The angle mirror system according to claim 18, wherein the vehicle further comprises a weapon cradle and the vehicle body further comprises a roof, wherein the angle mirror housing is connected to the roof and the objective housing is connected to the weapon cradle.

\* \* \* \* \*